United States Patent
Dolazza

(10) Patent No.: US 6,823,086 B1
(45) Date of Patent: Nov. 23, 2004

(54) ADAPTIVE SPATIAL FILTER

(75) Inventor: Enrico Dolazza, Boston, MA (US)

(73) Assignee: Analogic Corporation, Peabody, MA (US)

(*) Notice: Subject to any disclaimer, the term of this patent is extended or adjusted under 35 U.S.C. 154(b) by 568 days.

(21) Appl. No.: 09/651,529

(22) Filed: Aug. 29, 2000

(51) Int. Cl.⁷ .................................................. G06K 9/40
(52) U.S. Cl. ........................ 382/261; 382/263; 382/264; 348/610
(58) Field of Search ................. 382/210, 211, 382/260–265; 348/606, 610

(56) References Cited

U.S. PATENT DOCUMENTS

| | | | | |
|---|---|---|---|---|
| 3,932,737 A | * | 1/1976 | Delepine | 702/76 |
| 3,988,534 A | * | 10/1976 | Sacks | 348/171 |
| 4,701,953 A | * | 10/1987 | White | 704/226 |
| 4,956,867 A | * | 9/1990 | Zurek et al. | 381/94.7 |
| 5,168,375 A | * | 12/1992 | Reisch et al. | 382/250 |
| 5,384,869 A | * | 1/1995 | Wilkinson et al. | 382/240 |
| 5,764,307 A | * | 6/1998 | Ozcelik et al. | 348/608 |
| 5,796,875 A | * | 8/1998 | Read | 382/261 |
| 6,075,632 A | * | 6/2000 | Braun | 398/79 |
| 6,216,144 B1 | * | 4/2001 | De Vogel | 715/526 |
| 6,246,783 B1 | * | 6/2001 | Avinash | 382/128 |
| 6,421,097 B1 | * | 7/2002 | O'Rourke | 348/607 |

* cited by examiner

Primary Examiner—Bhavesh M. Metha
Assistant Examiner—Yubin Hung
(74) Attorney, Agent, or Firm—McDermott Will & Emery LLP

(57) ABSTRACT

A system for adaptively filtering an image so as to reduce a noise component associated with the image includes an image analyzer for determining image parameters related to the image. The system also includes a spatial filter, having an adjustable kernel responsive to the image parameters, for filtering the image sequence. The image analyzer manipulates the filter kernel as a function of the image parameters so that the system produces a filtered image, adaptable in real time, as a function of the unfiltered image, external rules, predetermined constraints, or combinations thereof. The spatial filter includes a time-invariant section and an adaptable section. The time-invariant section preferably applies a plurality of filters to the image, each of the filters having a distinct frequency response, so as to produce a plurality of distinct filtered outputs. The adaptable section scales each of the plurality of distinct filtered outputs with a corresponding distinct weighting value to produce a plurality of scaled filtered outputs, and combines the plurality of scaled filtered outputs to produce a composite filtered output.

32 Claims, 6 Drawing Sheets

$F\{I_0\} = B_0$ $F\{I_1\} = B_1$ $F\{I_2\} = B_2$ $F\{I_3\} = B_3$ $F\{I\}$

2D HALF BAND
3×3 FILTER

ADAPTIVE SPATIAL FILTER

CROSS-REFERENCE TO RELATED APPLICATIONS

This application is related to the following U.S. application filed contemporaneously herewith, of common assignee, the contents of which are incorporated herein in their entirety by reference:

"Adaptive Spatial And Temporal Filter For Noise Reduction In Image Sequences," invented by Enrico Dolazza, U.S. patent application Ser. No. 09/651,535, filed Aug. 29, 2000.

STATEMENT REGARDING FEDERALLY SPONSORED RESEARCH

Not Applicable.

REFERENCE TO MICROFICHE APPENDIX

Not Applicable.

FIELD OF THE INVENTION

The present invention relates to image filtering, and more particularly, to systems for and methods of spatial image filtering, wherein such systems and methods are adaptable so as to optimize the filtering performance.

BACKGROUND OF THE INVENTION

There are cases in which images should be spatially filtered with a kernel that automatically adapts its filtering characteristic as a functions of certain "indexes."

Examples of such cases are:

1. In noisy image sequences (e.g., fluoro sequences that are characterized by high photon noise), the filter may be part of a "spatial/temporal" filter that filters in three dimensions; in two spatial dimensions and in time. Co-pending U.S. patent application Ser. No. 09/651,535, filed Aug. 29, 2000, entitled "Adaptive Spatial And Temporal Filter For Noise Reduction In Image Sequences," and invented by Enrico Dolazza, describes one embodiment of such a spatial/temporal filter. In such a spatial/temporal filter, the spatial filtering component may vary as a function of how much the overall filter should filter in the spatial domain verses the time domain.

2. In compressing image sequences using algorithms that track the motion of the scene, a blurring (i.e., defocusing) of the area of the image where the motion occurs leads to higher compression ratio and lower compression artifacts. In this case the "index" to which the filter adapts is the interframe degree of motion.

3. There are image acquisition devices in which an anisotropic blurring effect takes place as a fixed function of the image location. For example, consider an x-ray detector that has an absorbing layer thickness that is not negligible, and a surface area that is large relative to the distance from the detector surface to the x-ray focal spot. In such a arrangement, the x-rays passing through the detector near the detector perimeter pass through at a significant angle with respect to an axis that is perpendicular to the detector surface. This angular path through the detector produces a blurring effect in portions of the resulting image that correspond to the detector perimeter. In such a case a correction can be performed with a spatial filter whose kernel is a function of the location within the image.

It is an object of the present invention to provide a method of performing such adaptive filtering as required for the preceding examples. The method can be implemented by a software algorithm that is executed on a computer system, or by a circuit which correlates with real time (i.e., 30 or 60 frames/second) image sequences.

SUMMARY OF THE INVENTION

The foregoing and other objects are achieved by the invention which in one aspect comprises a system for adaptively filtering an image including a plurality of image pixels, so as to selectively modify the pixels as a function of one or more filtering indexes. The system includes an index source for providing the filtering one or more indexes. In one embodiment, the index source may include an image analyzer that generates the filtering index as a function of some aspect of the image, such as the location of the pixel to be filtered within the image. In another embodiment, the index source may include an external source, such as a device that tracks the motion in the image scene and provides the index as a function of the motion. In another embodiment, the external source may an image sequence analyzer in a spatial/temporal filter, such that the index provides information as to how much the overall filter should filter in the spatial domain verses the time domain. The system further includes a spatial filter for filtering the image, including a time-invariant section and an adaptive section. The spatial filter includes an adaptive kernel that is responsive to the one or more filtering indexes and is adjustable in real time. The adaptive kernel defines the filtering process that is performed upon each of the image pixels.

In another embodiment of the invention, the time-invariant section produces a plurality of distinct filtered outputs, each of which is characterized by a distinct frequency response. The adaptive section scales each of the distinct filtered outputs with a distinct weighting value so as to produce a plurality of scaled filtered outputs, and the adaptive section further combines the plurality of scaled filtered outputs so as to produce a composite filtered output. Preferably the combination includes simple adding, although other embodiments may include other arithmetic operations to combine the scaled filtered outputs. In one preferred embodiment, each of the distinct weighting values is variable as a predetermined function of the one or more filtering indexes. The variability of the weighting values provides the adaptability of the invention.

In another embodiment of the invention, a control section varies the distinct weights according to the one or more filtering indexes related to the image.

In another embodiment of the invention, the time-invariant section further includes a plurality of distinct filtering sections, each of which is characterized by a distinct frequency response.

In another embodiment of the invention, the adaptive section further includes, for each of the distinct filtered outputs, a multiplier for multiplying the associated filtered output by the weighting value so as to produce the scaled filtered output. The adaptive section also includes an adder for summing the plurality of scaled filtered outputs so as to produce the composite filtered output.

In another embodiment of the invention, the image parameters include one or more of absolute pixel values, pixel values relative to one or more surrounding pixels, an image boundary location, and pixel location relative to the image boundary location.

In another embodiment of the invention, the image analyzer determines the image parameters for each image pixel individually.

In another embodiment of the invention, the kernel further includes a constraint of maintaining a substantially constant noise equivalent bandwidth (NEB).

In another embodiment of the invention, the kernel further includes a constraint of maintaining a substantially constant DC value, so as to produce a substantially constant image intensity.

In another embodiment of the invention, the kernel may be selectably configured so as to provide static operation that is not adaptive in real time.

In another embodiment of the invention, the kernel decomposes the image into multiple frequency bands, such that a set of weighting coefficients applied to data in each of the frequency bands is adaptive in real time.

In another embodiment of the invention, the kernel is characterized by a bandwidth, and the bandwidth may be varied by zero padding.

In another embodiment of the invention, the weighting coefficients are separated by intervals of $2^N$, where N is an integer.

In another embodiment of the invention, the kernel includes a vertical processing branch for processing vertical scans of the image, and a horizontal processing branch for processing horizontal scans of the image, the vertical processing branch and the horizontal processing branch being substantially separate and independent.

In another embodiment of the invention, each vertical and horizontal processing branch includes a weighting function for modifying pixel data within the branch.

In another embodiment of the invention, the weighting function includes one or more of the following: a multiplier, a look-up table, a state machine, a processor, or a digital network.

In another embodiment of the invention, the weighting function in each branch is adjustable, independent of the other branch.

In another embodiment of the invention, the image analyzer further includes a noise analyzer for distinguishing an image change that derives from image noise, from an image change that derives from a change in a scene depicted by the image.

In another embodiment of the invention, the image analyzer quantifies, in addition to determining, the image parameters.

In another embodiment of the invention, the spatial filter decomposes the image into a plurality of image components, each of the image components including information within a predetermined two dimensional frequency band. The spatial filter also applies one of a plurality of weights to each of the image components so as to produce a plurality of weighted image components. The spatial filter further linearly combines the weighted image components, so as to produce a filtered image.

In another embodiment of the invention, the image components are related such that their respective predetermined two dimensional frequency bands vary geometrically.

In another embodiment of the invention, the values of the weights applied to the image components are responsive to the image analyzer.

In another aspect, the invention comprises a method of adaptively filtering an image including a plurality of image pixels, so as to selectively modify the pixels as a function of one or more filtering indexes. The method includes determining one or more filtering indexes, and filtering the image via a spatial filter having an adaptive kernel that is responsive to the one or more filtering indexes and being adjustable in real time. The kernel defines the filtering process performed upon each of the image pixels.

Another embodiment of the invention further includes determining the filtering indexes for each image pixel individually.

Another embodiment of the invention further includes determining filtering indexes as a function of an aspect of the image.

In another embodiment of the invention, the aspect of the image includes the location of the pixel to be filtered within the image.

In another embodiment of the invention, the aspect of the image includes scene changes between different images within a sequence of images.

Another embodiment of the invention further includes quantifying, in addition to determining, the filtering indexes.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1A:
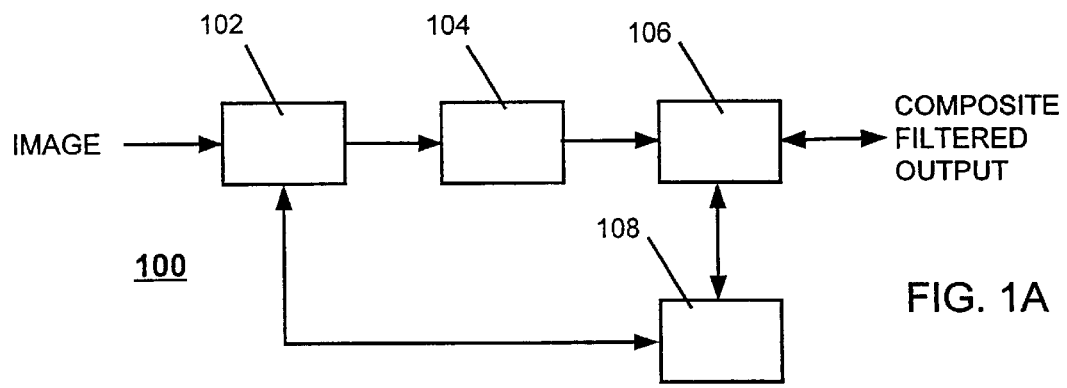
FIG. 1A shows a block diagram of one preferred embodiment of an adaptive spatial filter for reducing noise in an image.

FIG. 1A shows a block diagram of one preferred embodiment of an adaptive spatial filter 100 for selectively modifying the constituent pixels of an image as a function of one or more filtering indexes, including an image analyzer 102, a time-invariant filter section 104, an adaptive filter section 106, and a control section 108. An image is decomposed, row by row, into a string of pixels, and the pixels are provided to the input of the time-invariant filter section 104.

Figure 1B:
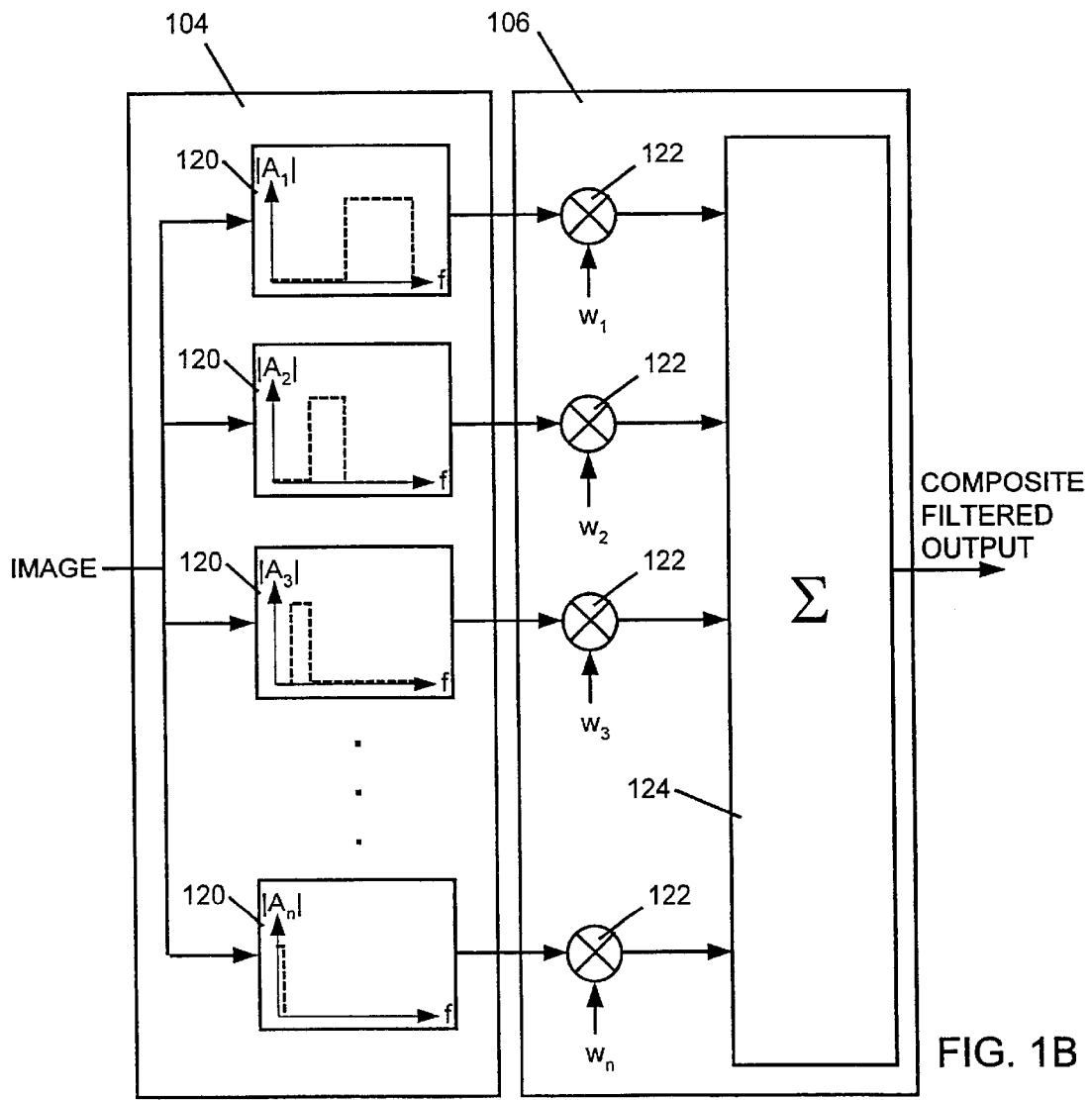
FIG. 1B shows an alternate embodiment of the adaptive spatial filter shown in FIG. 1A.
Figure 2:
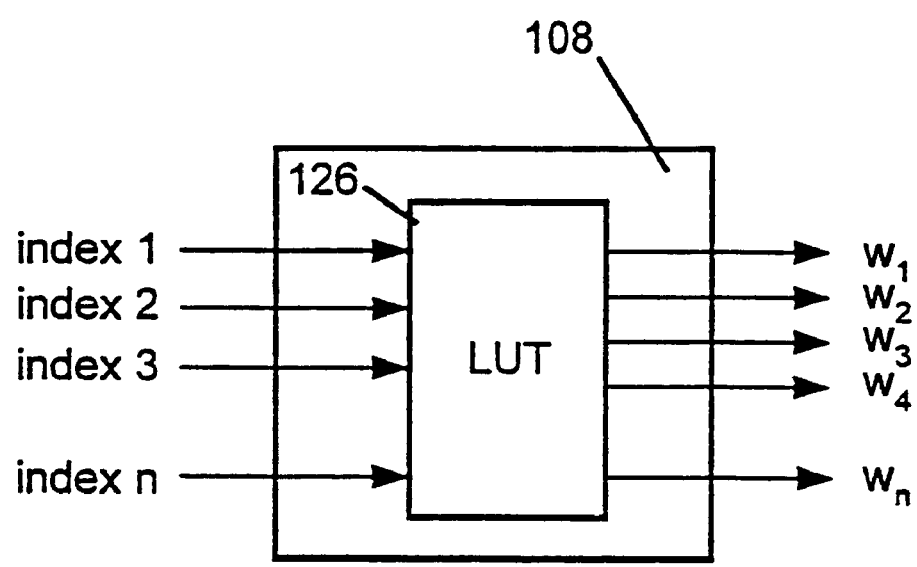
FIG. 2 illustrates a preferred embodiment of the control section shown in FIG. 1A.

In general, the time-invariant filter section 104 applies constant filtering characteristics to the image so as to produce multiple filtered outputs, each of which represents a different frequency band of the image. FIG. 1B provides a second, equivalent view of the time-invariant filter section 104, along with the adaptive filter section 106. As FIG. 1B shows, the time-invariant filter section 104 may be viewed as multiple discrete filter sections 120, each having a different, but constant, frequency response. Inside of each discrete filter section 120 in FIG. 1B is a representative frequency vs. magnitude sketch of the frequency response of that filter section 120. Because each of the filtered outputs derives from a constant, time-invariant filtering characteristic, the time-invariant filter section 104 can operate at high pixel rates, so that the number of images processed per unit time can be maintained at a high enough rate to support applications with real time image sequences, as described herein. The adaptive filter section 106 receives the outputs of the discrete filter sections 120, and applies a weighting value $w_n$ to the $n^{th}$ filtered output (where n is an arbitrary indexing integer). As shown in FIG. 1B, each weighting value is applied to the associated filtered output by a multiplier 122. The magnitude of each weighting value is variable, preferably independent of the other weighting values, and under the control of the control section 108. The control section 108 varies the weighting values $w_n$ as a function of indexes as described herein, so as to provide the adaptability of the spatial filter 100. In one preferred embodiment, the image analyzer 102 determines the various indexes from an analysis of parameters of the image, and passes the indexes along to the control section 108. In other embodiments, the indexes that the control section uses 108 may be provided by an external source, such as an analysis of subsequent images of an image sequence, or from some external rule. For example, an external rule may provide that certain portions of the image should be more filtered (e.g., the image perimeter regions), while other portions of the image should be less filtered (e.g., regions near the center of the image). FIG. 2 shows a preferred embodiment of the control section 108 wherein the weighting values $w_n$ are stored in a look-up table 126 (LUT), such that the LUT 126 maps control signals from the image analyzer into weighting values that are provided to the adaptive filter section 106. The plurality of scaled filtered outputs that result from the multipliers 122 are preferably combined by an accumulator 124 so as to produce a composite filtered output. Although a preferred embodiment combines the scaled filtered outputs in a linear summation, other mathematical operations, e.g., non-linear combinations, may also be used.

The spatial filter operates by decomposing the overall image in real time into a set of constituent images that may be represented by the set $\{I_0, I_1, \ldots I_N\}$, such that the $j^{th}$ image $I_j$ contains only information from within the two-dimensional frequency band $B_j$ of the original image. The constituent images ($I_j$, for all j from 0 to N) are then weighted with coefficients $w_j$ that can vary on pixel-by-pixel basis under the control of the image analyzer 102. The weighted constituent images ($w_j I_j$, for all j from 0 to N) are added to form the spatially filtered image I*, expressed by the following equation:

$$I^* = \sum_0^N w_j I_j \qquad (1)$$

When all of the weighting coefficients $w_j$ are equal to 1, the filtered image I* is exactly equal to the unfiltered image I.

Thus, the image analyzer can control the amount of filtering that the spatial filter applies to the image I by controlling the weighting coefficients $w_j$.

Figure 3A:
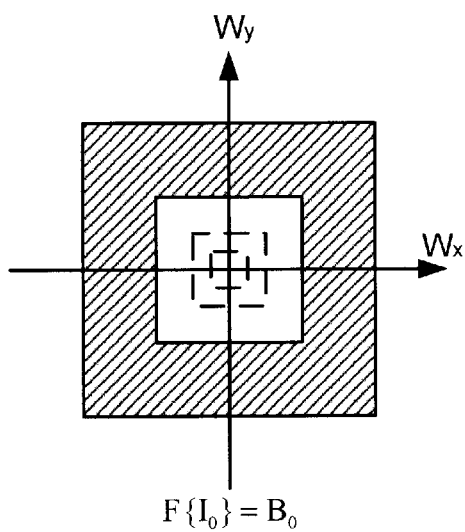
FIG. 3A shows a graphical representation of a two dimensional frequency band of a first constituent image.
Figure 3B:
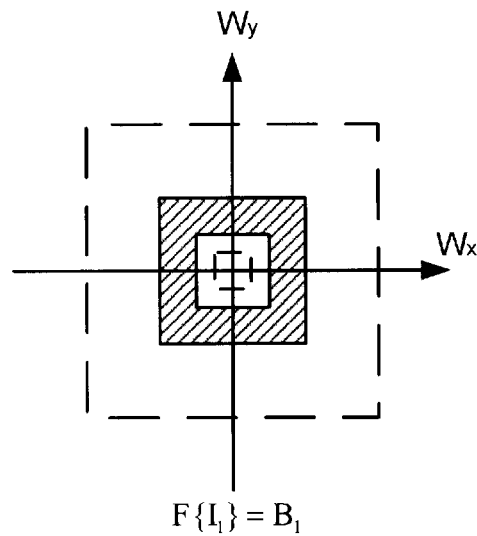
FIG. 3B shows a graphical representation of a two dimensional frequency band of a second constituent image.
Figure 3C:
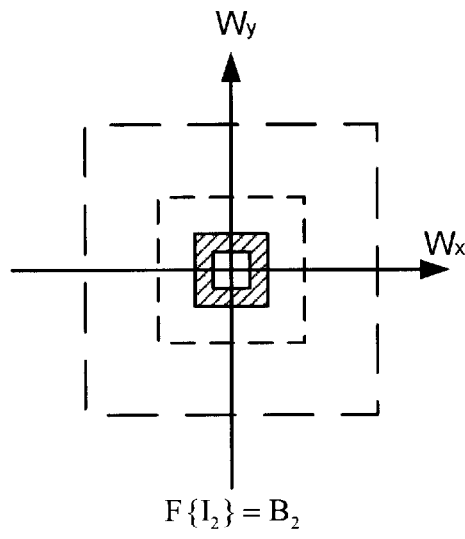
FIG. 3C shows a graphical representation of a two dimensional frequency band of a third constituent image.
Figure 3D:
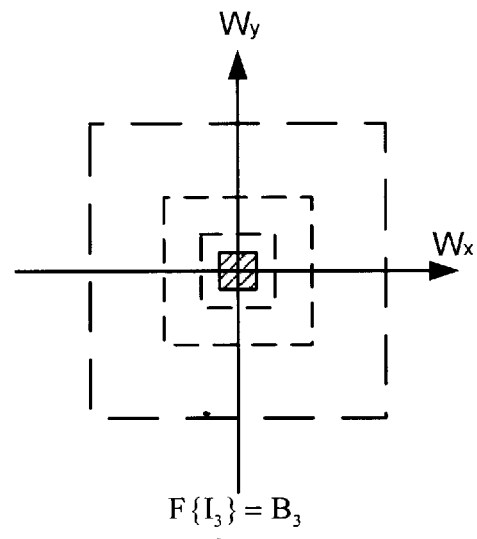
FIG. 3D shows a graphical representation of a two dimensional frequency band of a fourth constituent image.
Figure 3E:
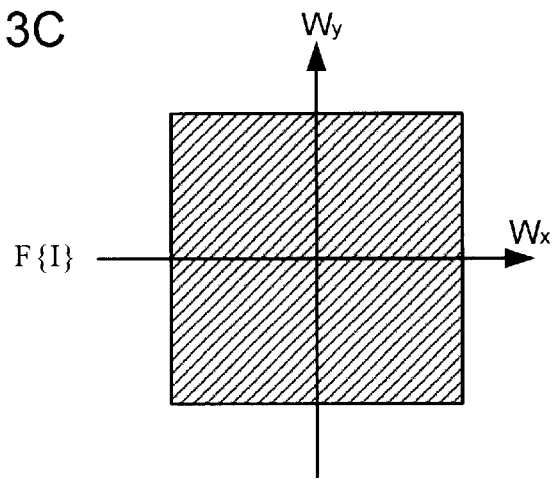
FIG. 3E shows a graphical representation of an image from which the constituent images of FIGS. 3A, 3B, 3C and 3D are decomposed.

The two dimensional frequency bands $B_j$ preferably each have a bandwidth that varies geometrically (i.e., such that adjacent bands have a constant bandwidth ratio) because of visual perceptions. For instance, $B_0$, i.e., the band that contains the highest spatial frequencies, should have a two dimensional bandwidth approximately equal to ½ of the total two dimensional spectrum; $B_1$, i.e., the frequency band adjacent to $B_0$, should have a bandwidth approximately equal to ¼ of the total spectrum, and so on. FIGS. 3A, 3B, 3C and 3D show graphical representations of the two-dimensional frequency bands $B_j$ of the constituent images $I_j$, for all j from 0 to 3, that were decomposed from the image I shown in FIG. 3E.

For most practical applications, the frequency components of the constituent image $I_j$ should substantially overlap in order to avoid sharp variations or discontinuities in the spectrum of the filtered image. In fact, a sharp variation of an image spectrum causes ringing artifacts in the spatial domain. Further, the frequency overlap of the spectra of the images $I_j$ that is desired to minimize spectrum discontinuities also has the significant advantage of simplifying the implementation of the image decomposition. Processing the different successive bandwidths as described herein is generally accomplished by successively changing the relative size of the filter kernel with respect to the size of the image. One way to do so is to decimate the image by successively changing the sample rate and discarding image pixels prior to filtering, while maintaining a constant but relatively large filter kernel for each successive decimated image. This results in steep transitions with little or no overlap in the resulting frequency components. Another way is to process the different successive bandwidths is to successively change the size of the filter kernel, while processing all (or a constant number of) the image pixels during each successive filtering step. This method typically results in successively larger filter kernels and a correspondingly large number of overall processing operations. The size of the filter kernels used in this method are small relative to the first-described method that maintains a constant kernel size. The smaller filter kernels result in slower transitions at the frequency band edges, which reduces ringing. The disadvantage to this second method is that the kernel may increase in size exponentially, such that the overall number of operations to the successive images is large. One preferred embodiment of the present invention uses aspects of both methods, because it maintains a constant kernel size for successive images, but uses a relatively small kernel size, so as to provide for slower frequency band transitions. The invention introduces zero-padding, as described herein, to successively change the relative size of the filter kernel with respect to the size of the image. Although the overall number of operations is large, the operations that involve the "zero" locations (from the zero-padding) are relatively simple, and therefore do not require a significant amount of additional processing power. Thus, the invention avoids sharp variations or discontinuities in the spectrum of the filtered image, so as to reduce ringing, while minimizing the processing power required to process the successive images.

The image decomposition can be implemented using a set of two-dimensional pass band filters or, more conveniently, cascading a set of two-dimensional low pass filters that have a cut-off frequency that decreases geometrically, and combining their outputs to generate the constituent images as follows:

$$I_0 = I*(1-L_0) \quad (2)$$

$$I_1 = I*L_0*(1-L_1) \quad (3)$$

$$I_2 = I*L_0*L_1*(1-L_2) \quad (4)$$

$$I_3 = I*L_0*L_1*L_2*(1-L_3) \quad (5)$$

$$I_{N-1} = I*L_0*L_1*L_2* \ldots *(1-L_{N-1}) \quad (6)$$

$$I_N = I*L_0*L_1 \cdot L_2* \ldots * L_{N-1} \quad (7)$$

This particular implementation of the image decomposition guarantees that $$\sum_0^N I_j = I.$$

Figure 4:
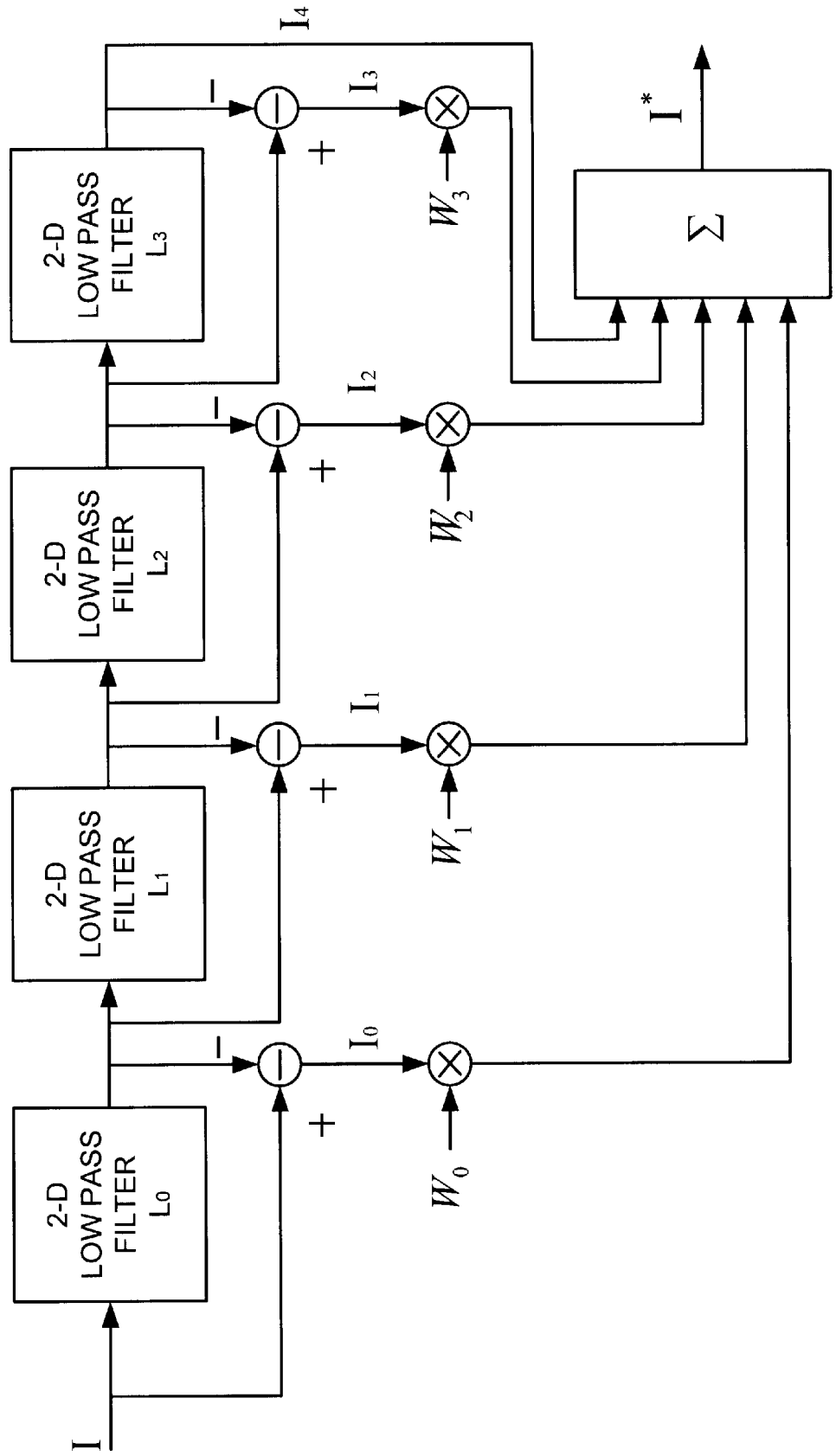
FIG. 4 illustrates how several low pass filters may be connected together to perform the desired image decomposition.

FIG. 4 illustrates how several low pass filters $L_j$ may be connected together to perform the decomposition described by equations (2) through (7).

Figure 5:
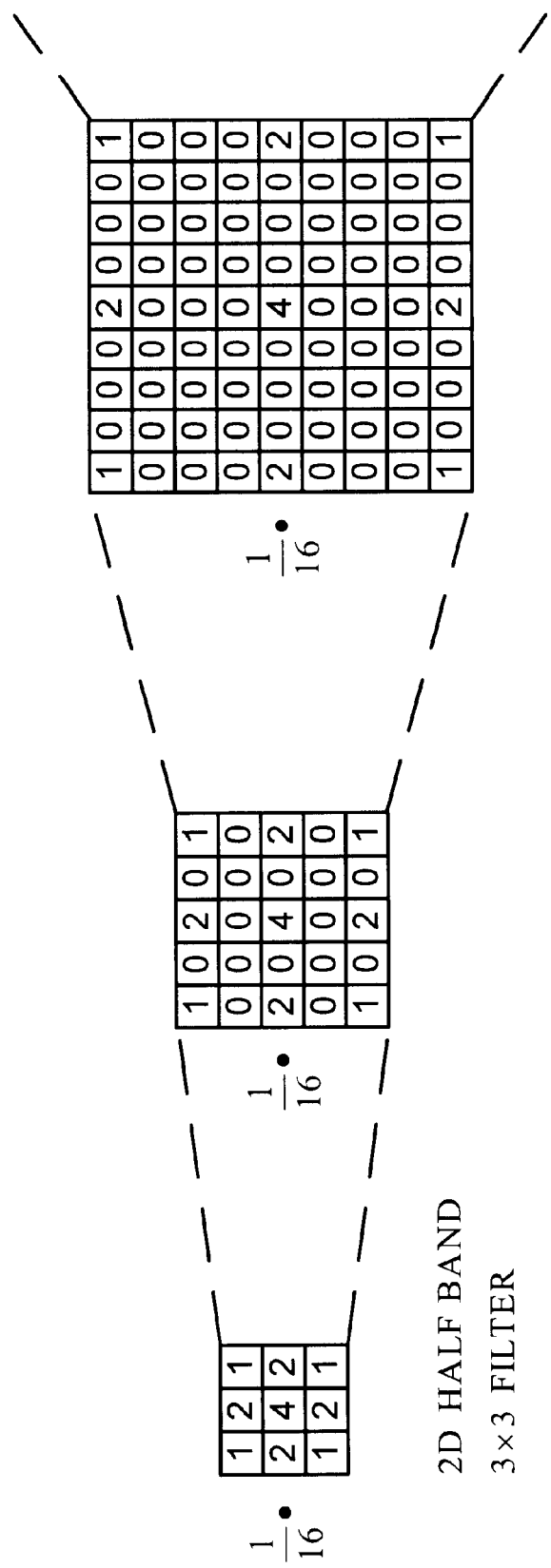
FIG. 5 illustrates an embodiment of the kernels of a first exemplary filter family, where the $L_0$ filter includes a two dimensional half band 3×3 filter.
Figure 6:
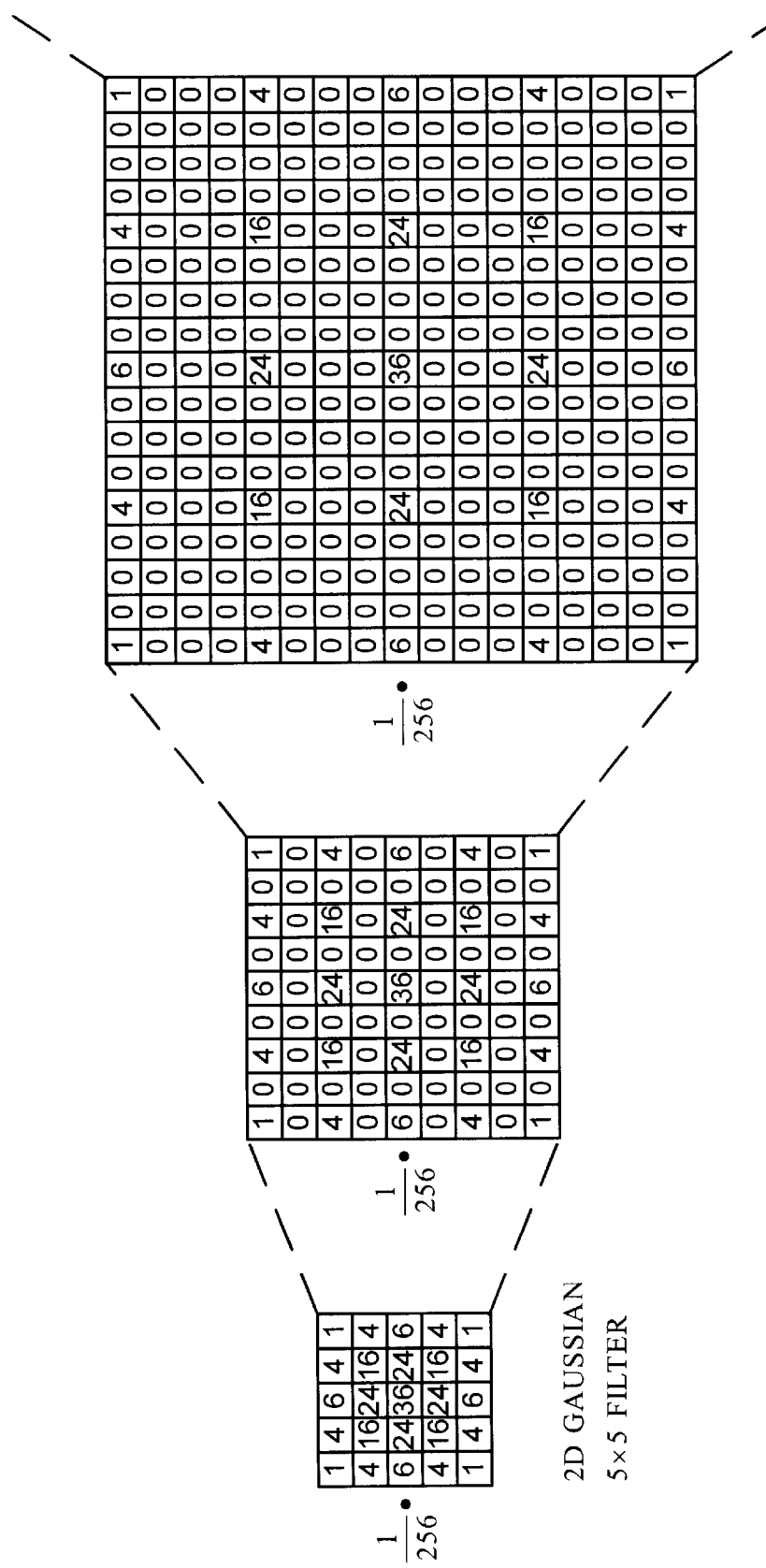
FIG. 6 illustrates an embodiment of the kernels of a second exemplary filter family, where the $L_0$ filter includes a two dimensional Gaussian 5×5 filter.

A further simplification is possible (and it is in fact exploited) in the illustrated embodiment. Because of manner in which the low pass filters $L_j$ are connected, the generic filter $L_j$ does not need to attenuate all frequency components above its cut-off frequency, but that it only must attenuate those frequency components higher than its cut-off frequency that have not been already attenuated by the preceding filters $L_j-1, \ldots L_0$. This suggests that the kernels of the filters $L_1, L_2, \ldots L_N-1$, all of which must have a size that grows geometrically in both the x and y directions, can be derived from the kernel of $L_0$, with padding of a proper number of all zero lines and all zero columns. Thus, all of the filter kernels will have the same number of non-zero coefficients as that of $L_0$, thus substantially reducing the number of multiply/accumulate operations required by the overall process. FIG. 5 illustrates an embodiment of the kernels of a first exemplary filter family, where the $L_0$ filter includes a two dimensional half band 3×3 filter. FIG. 6 illustrates an embodiment of the kernels of a second exemplary filter family, where the $L_0$ filter includes a two dimensional Gaussian 5×5 filter.

The adaptive filter section 106 modifies the NEB of the filtered image by an amount ρ, similar to the modification for the time-invariant filter section 104. It is always possible to evaluate ρ as a function of the coefficients of the filter kernel that is equivalent to the filtering process described above. The kernel of the equivalent filter is in fact the linear combination of the kernels of the band pass filters used to decompose the image I into the constituent images $I_j$, for all j from 0 to N. If, however, at each two dimensional filtering stage, the frequency spectrum of the image is reduced by a constant factor φ in both x and y direction, ρ can be also evaluated on the basis of the following equation $$\rho = \sum \frac{w_j^2}{\phi^{j+1}} + \frac{w_N^2}{\phi^N} \quad (8)$$

This equation provides an exact value of the noise modification ρ if the frequency bands of the constituent images $I_j$ do not overlap. If, on the other hand, the frequency bands of the constituent images $I_j$ overlap, equation (8) provides an approximate but conservative estimate of the true modification of the image NEB.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for adaptively filtering an image including a plurality of image pixels, so as to selectively modify the pixels as a function of one or more filtering indexes, the system comprising:

an index source for providing the one or more filtering indexes; and, a 2-dimensional spatial filter for filtering the image, including a time-invariant section and an adaptive section, the spatial filter having an adaptive kernel that is responsive to the one or more filtering indexes and being adjustable in spatial dimension in real time, wherein the kernel defines the filtering process performed upon each of the image pixels.

2. A system according to claim 1, wherein the index source includes an image analyzer that generates the one or more filtering indexes as a function of an aspect of the image.

3. A system according to claim 2, wherein the aspect of the image includes the location of the pixel to be filtered within the image.

4. A system according to claim 1, wherein the index source includes an external source, such that the one or more indexes are not a direct function of the image pixels being filtered.

5. A system according to claim 1, wherein (i) the time-invariant section produces a plurality of distinct filtered outputs, each of which is characterized by a distinct frequency response;

(ii) the adaptive section scales each of the distinct filtered outputs with a distinct weighting value so as to produce a plurality of scaled filtered outputs; and, (iii) the adaptive section adds the plurality of scaled filtered outputs so as to produce a composite filtered output.

6. A system according to claim 5, wherein each of the distinct weighting values is variable as a function of the one or more filtering indexes.

7. A system according to claim 5, wherein a control section varies the distinct weights according to the one or more image parameters related to the image.

8. A system according to claim 5, wherein the time-invariant section further includes a plurality of distinct filtering sections, each of which is characterized by a distinct frequency response.

9. A system according to claim S, wherein the adaptive section further includes:

(i) for each of the distinct filtered outputs, a multiplier for multiplying the associated filtered output by the weighting value so as to produce the scaled filtered output; and, (ii) an adder for summing the plurality of scaled filtered outputs so as to produce the composite filtered output.

10. A system according to claim 7, wherein the image parameters include one or more of:

absolute pixel values, pixel values relative to one or more surrounding pixels, an image boundary location, and pixel location relative to the image boundary location.

11. A system according to claim 2, wherein the image analyzer determines image parameters for each image pixel individually.

12. A system according to claim 1, wherein the kernel further includes a constraint of maintaining a substantially constant noise equivalent bandwidth (NEB).

13. A system according to claim 1, wherein the kernel further includes a constraint of maintaining a substantially constant DC value, so as to produce a substantially constant image intensity.

14. A system according to claim 1, wherein the kernel may be selectably configured so as to provide static operation that is not adaptive in real time.

15. A system according to claim 1, wherein the kernel decomposes the image into multiple frequency bands, such that a set of weighting coefficients applied to data in each of the multiple frequency bands is adaptive in real time.

16. A system according to claim 15, wherein the kernel is characterized by a bandwidth, and the bandwidth may be varied by zero padding.

17. A system according to 15, wherein the weighting coefficients are separated by intervals of $2^N$, where N is an integer.

18. A system according to claim 1, wherein the kernel includes a vertical processing branch for processing vertical scans of the image, and a horizontal processing branch for processing horizontal scans of the image, the vertical processing branch and the horizontal processing branch being substantially separate and independent.

19. A system according to claim 18, wherein each vertical and horizontal processing branch includes a weighting function for modifying pixel data within the branch.

20. A system according to claim 19, wherein the weighting function includes one or more of the following: a multiplier, a look-up table, a state machine, a processor, or a digital network.

21. A system according to claim 19, wherein the weighting function in each branch is adjustable independent of the other branch.

22. A system according to claim 2, wherein the image analyzer further includes a noise analyzer for distinguishing (i) an image change that derives from image noise, from (ii) an image change that derives from a change in a scene depicted by the image.

23. A system according to claim 2, wherein the image analyzer quantifies, in addition to determining, the image parameters.

24. A system according to claim 1, wherein the spatial filter (i) decomposes the image into a plurality of image components, each of the image components including information within a predetermined two dimensional frequency band, (ii) applies one of a plurality of weights to each of the image components so as to produce a plurality of scaled image components, and (iii) linearly combines the weighted image components, so as to produce a filtered image.

25. A system according to claim 24, wherein the image components are related such that their respective predetermined two dimensional frequency bands vary geometrically.

26. A system according to claim 24, wherein the values of the plurality of weights applied to the image components are responsive to the image analyzer.

27. A method of adaptively filtering an image including a plurality of image pixels, so as to selectively modify the pixels as a function of one or more filtering indexes, comprising:

determining one or more filtering indexes; and, filtering the image via a 2-dimensional spatial filter having an adaptive kernel that is responsive to the one or more filtering indexes and being adjustable in spatial dimension in real time, wherein the kernel defines the filtering process performed upon each of the image pixels.

28. A method according to claim 27, further including determining the filtering indexes for each image pixel individually.

29. A method according to claim 27, further including determining filtering indexes as a function of an aspect of the image.

30. A method according to claim 29, wherein the aspect of the image includes the location of the pixel to be filtered within the image.

31. A method according to claim 29, wherein the aspect of the image includes scene changes between different images within a sequence of images.

32. A method according to claim 27, further including quantifying, in addition to determining, the filtering indexes.

* * * * *

UNITED STATES PATENT AND TRADEMARK OFFICE
CERTIFICATE OF CORRECTION

PATENT NO. : 6,823,086 B1
DATED : November 23, 2004
INVENTOR(S) : Enrico Dolazza It is certified that error appears in the above-identified patent and that said Letters Patent is hereby corrected as shown below:

Column 8,
Line 52, after "claim", delete "S", and insert thereof -- 5 --.

Signed and Sealed this

Eighth Day of March, 2005

JON W. DUDAS
*Director of the United States Patent and Trademark Office*